E. A. HARRIS.
DEVICE FOR APPLYING CHAINS TO WHEELS.
APPLICATION FILED AUG. 19, 1912. RENEWED FEB. 23, 1915.
1,153,490.
Patented Sept. 14, 1915.
2 SHEETS—SHEET 1.
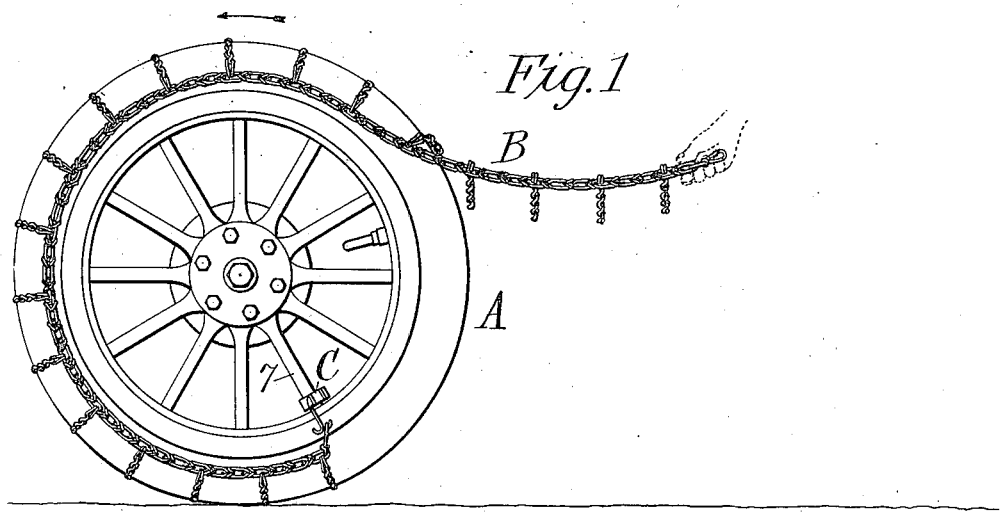
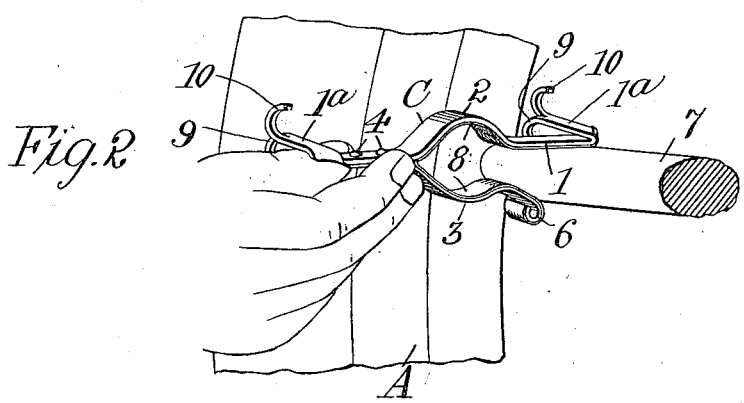
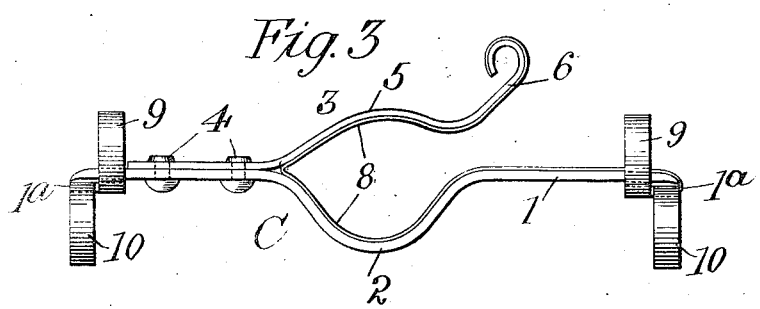

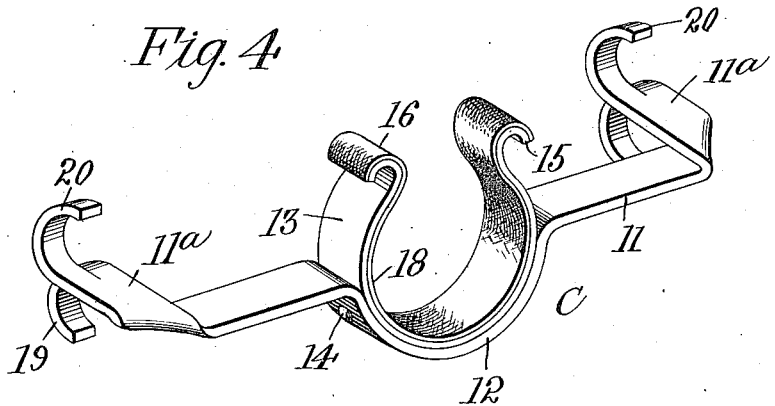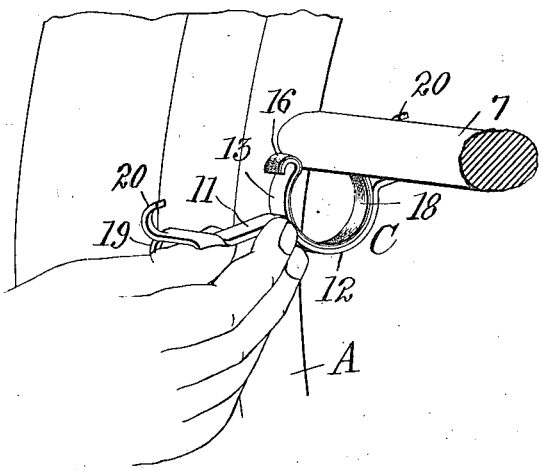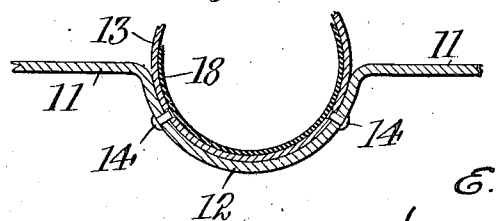

UNITED STATES PATENT OFFICE.

EARL A. HARRIS, OF SCRANTON, PENNSYLVANIA, ASSIGNOR TO ALCEMO MANUFACTURING COMPANY, OF NEWARK, NEW JERSEY, A CORPORATION OF NEW JERSEY.

DEVICE FOR APPLYING CHAINS TO WHEELS.

1,153,490. Specification of Letters Patent. Patented Sept. 14, 1915.

Application filed August 19, 1912, Serial No. 715,802. Renewed February 23, 1915. Serial No. 10,118.

*To all whom it may concern:*

Be it known that I, EARL A. HARRIS, a citizen of the United States, residing at Scranton, in the county of Lackawanna, State of Pennsylvania, have invented certain new and useful Improvements in Devices for Applying Chains to Wheels, of which the following is a specification.

The purpose of this invention is to provide a convenient and inexpensive device for facilitating the application of anti-skid chains to automobile wheels. Usually such chains are applied after the roadways, and also the tires, have become wet and muddy, and the operation of applying the chains to the wheels, by rolling the wheels onto the the chains, particularly under the conditions mentioned, is not easily accomplished because of the tendency of one end of the chain to slip off of the wheel while the operator is attempting to pick up and couple to it the other end of the chain; also with a muddy condition of the roadway, the chain necessarily becomes wet and muddy and the hands of the operator are apt to become much soiled in handling the chain before it is finally applied. By means of my invention, the chain may be applied to an automobile wheel in a very simple manner, without any possibility of the chain end slipping off the wheel, and without the necessity of handling any part of the chain, after it has come in contact with the roadway, except the links and hooks, or equivalent devices, by which the two ends of the chain are connected.

The details of my invention will be clear from the following description, taken in connection with the accompanying drawing, in which;

Figure 1 is a side elevation of an automobile wheel with my chain holding device applied thereto, illustrating the manner of holding and applying the chain; Fig. 2 is a perspective view of one form of the chain-holding device and a portion of a wheel showing the manner of applying the device to a wheel spoke; Fig. 3 is an edge view of the holding device shown in Fig. 2; Fig. 4 is a perspective view of a modified form of chain-holding device; Fig. 5 is a perspective view on a reduced scale, illustrating the method of applying such holding device to a spoke; and Fig. 6 is a fragmentary longitudinal section through the device shown in Fig. 4.

Referring to the drawing, A indicates an automobile wheel, B an anti-skidding chain therefor, and C indicates the holding device which forms the subject matter of my invention. This device comprises a clip composed of a bar 1, preferably a flat metal strip, having its central portion bowed, as shown at 2, and a spring metal member 3, riveted, as indicated at 4, to the bar 1, and having a bowed portion 5, opposed to the bowed portion 2 of the bar 1. The spring member 3 has its free end 6 inclined with respect to the body of the bar 1, so that the device may be readily sprung on to a spoke 7 of an automobile wheel, in the manner clearly illustrated in Fig. 2. The portions of the device which engage the wheel spoke are preferably faced with leather or other soft material, as indicated at 8. When the device is sprung over a spoke, the latter is gripped between the bowed portions 2 and 5, and the device is thereby held frictionally in position on the spoke, the bar 1 extending transversely of the wheel. The end portions 1ª of the bar 1 are bent at right angles to the body portion and project to similar distances from one edge of the bar in a plane parallel with the plane of the bar. These end portions are divided longitudinally at their extremities, and the tongues thus formed are bent over in opposite directions, forming hooks 9 and 10 on each end portion, as shown. When the device is applied to the outer end of the wheel spoke, the end portions 1ª will project radially outward at the sides of the rim, and the hooks 9 and 10 will extend circumferentially in opposite directions.

In applying a chain to a rear wheel of an automobile without lifting the wheel from the ground, the holding device is applied to one of the spokes at the rear of the hub, and the two connecting links at one end of the chain are passed over a pair of hooks on the holding device. The vehicle is then pushed forward until the wheel makes one revolution and the end of the chain attached to the holding device is thus carried around over the top of the wheel, under the mud guards, and again to the rear, into convenient position for coupling to the opposite end of the chain. The links on the first mentioned end are unhooked from the holding device, one at a time, and coupled to the other end of the chain, the holding device serving to support the chain end by one of its links while the other link is being unhooked and coupled to the opposite chain end. After the chain has been applied to the wheel, the holding device is removed by pulling it laterally off of the wheel spoke.

It is desirable, but not necessary to have double hooks on the end portions of the holding device, as a single pair of hooks would serve the purpose if the device were always applied to the spoke with reference to the direction in which the wheel is to be turned in applying the chain; but, by providing two hooks on each end piece, these hooks pointing in opposite directions, it is immaterial which way the wheel is turned or whether the device be applied to the spoke by forcing it from the inside or the outside of the wheel. When the hooks 10 are used for connecting to the chain, the draft of the chain will be exerted against the part 2 of the bar 1; but when the chain end is connected to the hooks 9, the draft of the chain will pull the spring 3 against the spoke. This spring is made heavy enough to resist such pull against it.

In Figs. 4, 5 and 6 I have illustrated a slightly modified form of holding device which form may prove more desirable in certain cases, and which, in fact, I regard as the preferred embodiment of the invention. Referring to these figures, the device comprises a flat bar 11, quite similar to the bar 1, and provided with a central bowed portion 12. The gripping spring is in the form of a curved clip 13, which fits within the bowed portion 12 of bar 11 and is secured thereto by means of suitable rivets 14. The ends of the clip 13 are preferably turned back as indicated at 15 to form rounded bearing faces 16 adapted to engage the spoke. The entire clip is preferably lined with a strip of felt or leather 18 to prevent scratching of the wheel. The bar 11 has at each end the radial arms 11ª, terminating in the oppositely deflected hooks 19, 20, adapted to engage the chain.

In placing the device in position on a spoke, it is given a sidewise, as distinguished from a longitudinal movement, such sidewise or lateral movement causing the rounded ends 16 of the spring clip to ride around the surface of the spoke and snap thereover as will be obvious from an inspection of Fig. 5. It will be noted that the device may be readily and quickly attached to any spoke from either side.

What I claim is:

1. Means for applying anti-skid chains to vehicle wheels comprising a holding device adapted to engage a wheel spoke, and be supported thereby, and means carried by said holding device for engaging the chain at each side of the wheel rim.

2. A holding device for applying anti-skid chains to vehicle wheels comprising a bar and means for frictionally supporting the bar on a wheel spoke, said bar having end portions adapted to extend radially outward at the sides of the wheel rim when the bar is upon a spoke, and said end portions having hooks for engaging the chain.

3. A holding device for applying anti-skid chains to vehicle wheels comprising a bar and means for frictionally supporting the bar on a wheel spoke, said bar having end portions adapted to extend outward at the sides of the wheel rim when the bar is upon a spoke, and said end portions each having two hooks extending in opposite directions circumferentially of the wheel.

4. A holding device for applying anti-skid chains to vehicle wheels comprising a bar having a central bowed portion, and end portions extending at an angle to the body of the bar and in the same direction therefrom, said end portions having hooked ends, and a curved spring clip secured to the bowed portion of said bar, the said spring clip being adapted to encircle and grip a wheel spoke within the bowed portion.

In testimony whereof I have affixed my signature, in presence of two witnesses.

EARL A. HARRIS.

Witnesses:
 FRED E. BEERS,
 GERTRUDE P. MORRIS.